(No Model.) 2 Sheets—Sheet 1.

W. P. INGHAM.
COIN RELEASED HEIGHT MEASURING APPARATUS.

No. 379,071. Patented Mar. 6, 1888.

(No Model.) 2 Sheets—Sheet 2.

W. P. INGHAM.
COIN RELEASED HEIGHT MEASURING APPARATUS.

No. 379,071. Patented Mar. 6, 1888.

UNITED STATES PATENT OFFICE.

WILLIAM PORRITT INGHAM, OF MIDDLESBROUGH, COUNTY OF YORK, ENGLAND.

COIN-RELEASED HEIGHT-MEASURING APPARATUS.

SPECIFICATION forming part of Letters Patent No. 379,071, dated March 6, 1888.

Application filed September 26, 1887. Serial No. 250,715. (No model.)

*To all whom it may concern:*

Be it known that I, WILLIAM PORRITT INGHAM, a subject of the Queen of Great Britain, residing at Middlesbrough-on-Tees, in the county of York, England, engineer, have invented an Improved Height-Measuring Apparatus, of which the following is a specification.

My invention relates to improvements in height-measuring apparatus, in which the height of a person or thing is indicated on a dial or scale by the act of depositing a coin or weight in the apparatus, which allows the arm to descend on the head of the person or thing resting or standing below it.

The mechanism constituting this invention is placed within a box or case, and is constructed and arranged in the following manner: An arm, which projects horizontally through a vertical slot in the front of the said box or case, has its inner end fixed to a vertical bar or rod sliding or working within the upper part of the said box or case, and the lower end of the said bar or rod is turned up in order to support a weight. On a horizontal spindle within the box or case is fixed a double pulley or wheel, (or two pulleys or wheels may be substituted for the same,) from one side of the periphery of which a balance-weight is suspended by a cord or tape, and from the other side of the periphery hangs a second cord or tape, the lower or free end of which is passed through an aperture in the weight and through an aperture or slot in the lower end of the before-mentioned bar or rod on which such weight rests, and is furnished with a button of such a size that the said button will pass freely through the aperture or slot in the end of the said bar or rod, but not through the aperture in the weight. On the before-mentioned spindle is a brake or catch wheel which is held, when in its normal position, by one end of a pivoted lever. When a circular dial or scale is employed, a hand or pointer is fixed at one end of the before-mentioned spindle for indicating the height of the person or thing being measured, and when a vertical scale is employed the hand or pointer is attached to the before-mentioned button or weight.

I will now proceed to refer to the accompanying drawings, from which the nature of the said invention will be more clearly understood.

The same letters of reference indicate like parts in all the figures.

Figure 1:
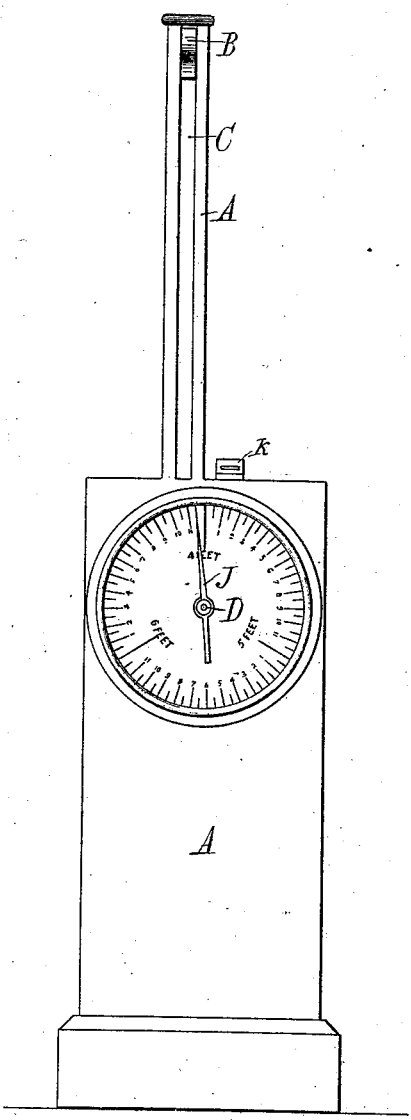
Figure 2:
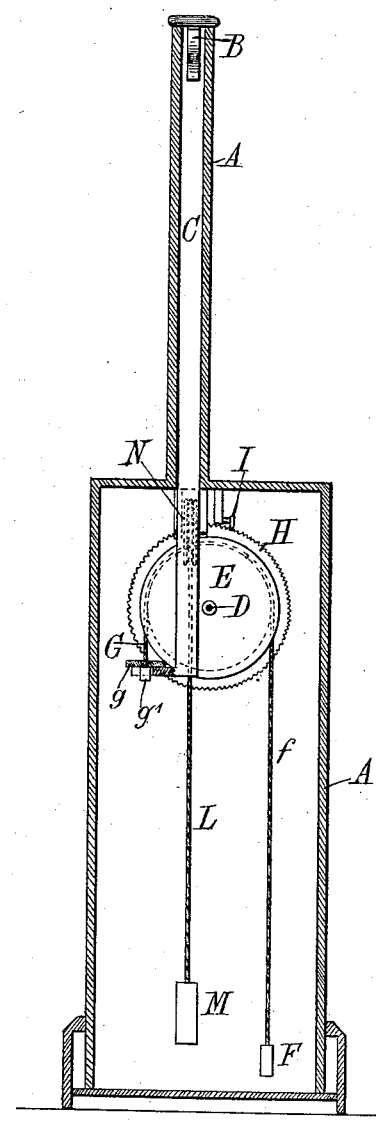
Figure 4:
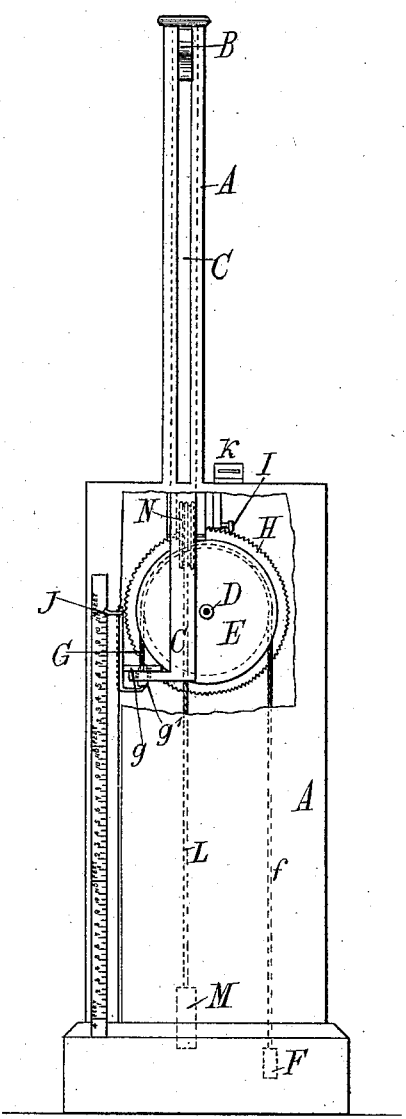
Figure 3:
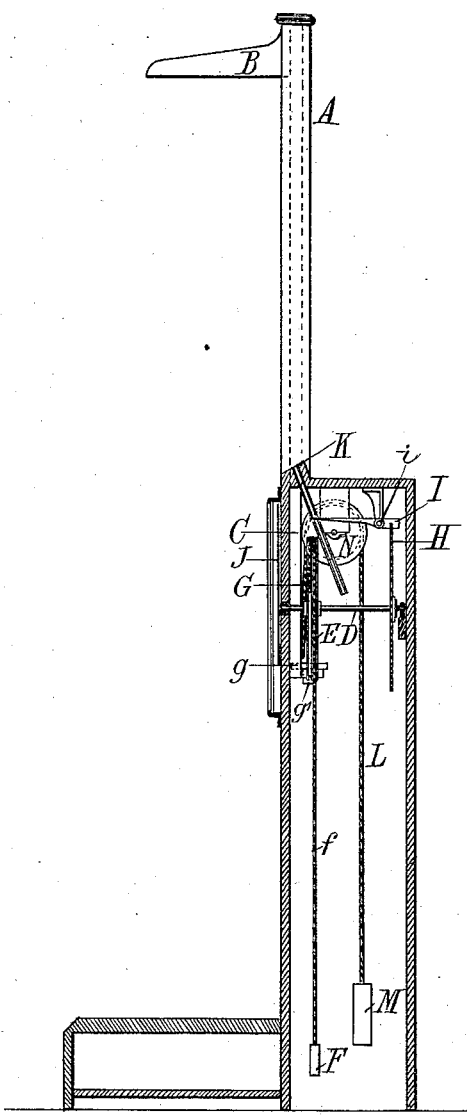

Figure 1 is a front elevation of the apparatus. Fig. 2 is a like view with the front of the box or case removed, and Fig. 3 is a vertical section. Fig. 4 is a front elevation showing a modification in the form of registering device.

A is the box or case; B, the horizontal arm passing through the vertical slot in the same, which arm is fixed to the vertical bar or rod C.

D is the horizontal spindle, on which is mounted the double pulley or wheel E, to the periphery of which is connected by a cord or tape, $f$, the balance-weight F and the cord or tape G, which passes through an aperture in the weight $g$ and through an aperture or slot in the end of the rod C. It will be observed that the cords or tapes $f$ and G pass over the periphery of the wheel or pulley E in opposite directions. The balance-weight F is heavier than the button $g'$ at the end of the cord or tape G, but is not equal to the combined weights of the said button $g'$ and the weight $g$.

H is the brake or catch wheel on the spindle D, and I is a lever, pivoted at $i$, for retaining the said brake or catch wheel in its normal position.

In Figs. 1, 2, and 3, above referred to, the mechanism constituting the subject of my present invention is shown arranged with the hand or pointer J on the spindle D for indicating the height of the person or thing being measured on a circular dial or scale, and Fig. 4 is a sectional view of an apparatus in which the hand or pointer is connected to the button $g'$ at the end of the cord or tape G, such hand or pointer passing through a slot in the box or case and indicating the height on a vertical scale.

K is a slot through which a coin or weight is passed to actuate the apparatus.

To the bar or rod C is connected one end of the cord or tape L, to the opposite end of which is attached the balance-weight M. The said cord or tape is passed over the pulley N.

If desired, the hand or pointer may be fixed and the dial or scale connected to the spindle D, as will be readily understood.

The action of the apparatus is as follows: The person whose height it is desired to ascertain stands in front of the machine, and the arm B is moved into a position immediately above his head. If, to effect this, it has been necessary to raise the arm B, the bar or rod C in its upward movement lifts the weight $g$ off the button $g'$ at the end of the cord G; but such movement does not affect the spindle D, as the same is retained in its position by the lever I and brake or catch wheel H. On a coin or article of the weight required being passed through the slot K, it falls on one end of the lever I and disengages the opposite end thereof from the wheel H, and the spindle D, being thereby freed, is caused to revolve by the action of the balance-weight F, and it continues to revolve until the button at the end of the cord G comes into contact with the weight $g$, when, owing to the combined weights of the said button and weight $g$ being greater than that of the balance-weight F, the revolution of the spindle D is arrested, and it will be found that the revolving movement of the said spindle will have caused the hand or pointer J to indicate on the dial or scale the height of the person being measured. If, on the contrary, in order to bring the arm B to its required position it has been necessary to lower the same, the descent of the bar or rod C will have left the weight $g$ suspended on the button $g'$ at the end of the cord G, the consequence being that when the wheel H is released the weight $g$, and with it the said button $g'$, will descend until the former rests on the end of the rod C, and the revolving movement of the spindle D, caused by the descent of the said weights, will have so moved the hand or pointer J that it will indicate the desired height on the dial or scale. When the lever I has been caused to travel a certain distance by the weight of the coin, the latter falls off, and the lever I is so formed, as will be well understood, that it regains its position and again brakes or catches the wheel H. This movement is caused by the lever passing through a slot in the coin-trough at right angles to the slot $k$, through which the coin passes, and regains its position to engage the wheel after the coin has escaped therefrom by being of greater weight at the end which engages the wheel.

It will be understood that the various parts of the mechanism above described must be of such a size and the dial or scale so graduated that the height indicated by the action of the mechanism hereinbefore described is correct.

What I claim is—

1. The combination of the arm B, the vertical sliding bar or rod C, provided at its lower end with an aperture, the weight $g$, the double pulley or wheel E, the balance-weight F, and the cords $f$ and G, substantially as and for the purpose set forth.

2. The combination of the arm B, rod or bar C, with the aperture in the end, the spindle D, carrying the indicating hand or pointer, the pulley E, the balance-weight F, suspended at one side, and the weight $g$ at the other, and the button $g'$, to engage the weight $g$, substantially as described.

3. The combination of the arm B, rod or lever C, hand or pointer J, the pulley E, the cords and weights, the brake-wheel H, the coin-trough provided with the slot, and the lever I, moving in the slot in the path of the coin to be acted upon by said coin to be disengaged thereby from the wheel, substantially as described.

4. The combination of the arm B, rod or bar C, with the aperture in its end, the spindle D, the double pulley or wheel E, the cords $f$ and G, the weights $g$ and F, the button $g'$, and the hand or pointer J, substantially as described.

WM. PORRITT INGHAM.

Witnesses:
 WILLIAM LAMBERT,
 *No. 1 Newport Road, Middlesbrough, Inn-keeper.*
 HENRY MACKERETH,
 31 *Waterloo Road, Middlesbrough, Solicitor's Clerk.*